G. W. GREGORY.

MANUFACTURE OF BOOTS AND SHOES.

No. 6,839.

Reissued Jan. 4, 1876.

Witnesses.

L. H. Latimer.

W. J. Pratt.

Inventor.

George W. Gregory

Assignee of Henry Pratt.

UNITED STATES PATENT OFFICE.

GEORGE W. GREGORY, OF BOSTON, MASSACHUSETTS, ASSIGNEE, BY MESNE ASSIGNMENTS, OF HENRY PORT.

IMPROVEMENT IN THE MANUFACTURE OF BOOTS AND SHOES.

Specification forming part of Letters Patent No. 39,421, dated August 4, 1863; antedated October 16, 1862; reissue No. 6,839, dated January 4, 1876; application filed November 22, 1875.

*To all whom it may concern:*

Be it known that HENRY PORT, of the city, county, and State of New York, invented certain Improvements in Boots and Shoes, of which the following is a specification:

In this invention the upper of the shoe is guarded at the toe and about its sides by a protecting-flange, rising from a piece of sole-leather extending under the upper, the turned-over portion of the latter and the insole fitting into a recess at the top of the sole-like piece of leather and within the protecting-flange. The protecting-flange rises from the sole, is shown as forming an integral portion thereof, and as having been formed by removing a portion of the leather adjacent to it in such manner as to leave the protecting edge extending above and about the foundation-piece.

This invention consists in a piece of sole-leather, provided about its edge with a protecting-lip. Also, in a piece of leather having a portion of its upper surface cut away or removed to form a recess to receive the upper, attached or lasted to the insole, and to permit the lip to extend about the upper. Also, in the combination, with an upper and an insole, of a piece of sole-leather, provided with an upper-protecting flange of sole-leather.

Figure 1:
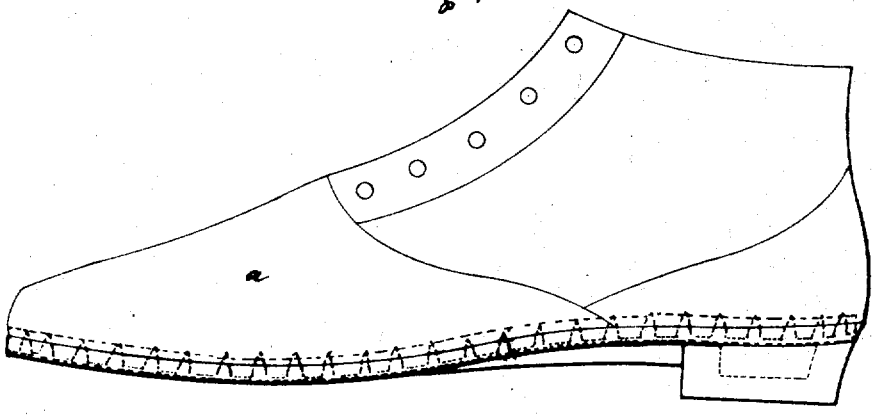
Figure 3:
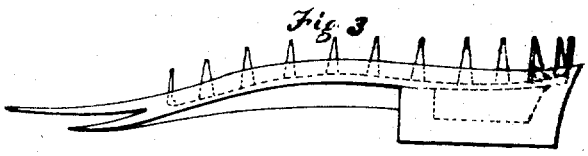
Figure 2:
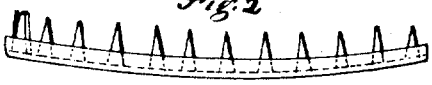
Figure 4:
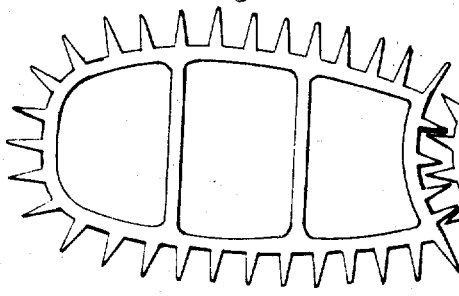
Figure 5:
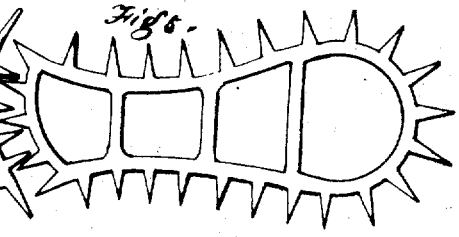
Figure 6:
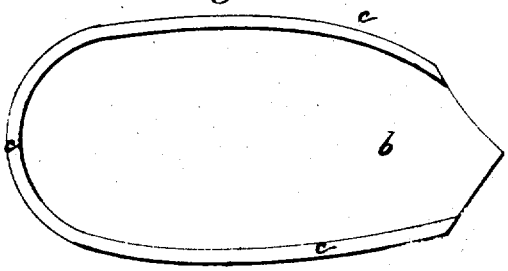
Figure 7:
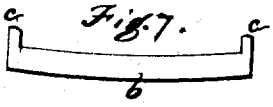

Figure 1 represents a side view of a shoe, with sole attached, it being provided with an insole in the usual manner; Fig. 2, the sole-like piece of sole-leather, with metallic fastenings driven therein from the outer side through the sole, and shown as the means for securing the sole to the upper and insole. Fig. 3 is an india-rubber shank and heel-piece, with incorporated rivets; Figs. 4 and 5 show the metallic sole-attaching skeleton of fastenings. Fig. 6 is a top view of the leather sole, and Fig. 7 a cross-section thereof.

The upper *a* is of ordinary construction, and with an insole is secured or lasted on a last in the ordinary manner, the last being preferably provided with a metallic bottom, and adapted to turn over the points of the fastenings, to cause them to clinch. The sole-shaped or piece of sole-leather *b* (see Figs. 6 and 7) has a protecting-flange, *c*, rising therefrom, and extending about the end and along the side of *b*, and adapted to guard and protect the toe and sides of the upper opposite the edge of the insole within the shoe. This flange is shown as part of the sole-like piece *b*, and is shown as formed by recessing or cutting away a portion of the upper side of the sole-leather piece *b*. The insole at the forward part of the shoe with the upper lapped about it, fits into this recessed upper portion of the sole, and within the curved part of the protecting-ledge, it fitting against the upper about the toe and along its sides, and guarding and protecting the upper from many blows and much wear. The sole is shown as adapted to be applied to the upper by means of metallic fastenings on a skeleton plate, (see Figs 4 and 5.) These fastenings are inserted from the outside, through holes in the thinner portion of the sole, back of the protecting-ledge, and when this sole is applied to the shoe, the fastenings are driven through the upper and insole and clinched in the usual way.

In Figure 3, the shank and heel-piece are shown as provided with metallic fastenings, incorporated therewith, and ready to be applied to the lasted shoe, in the manner just above described.

Prior to this invention, caps of india-rubber, metal, and upper leather have been commonly used to fit over or cap the toe of the upper, they forming protection very unsightly, as compared with the protecting-flange herein described, but the protecting-surface has in no case formed part of the sole, nor has a protecting lip or edge extended above the sole about the toe and sides of the upper, leaving a space back of or within the flange or recess at the upper portion of the sole, to receive the upper and insole.

The gist of this invention lies in this sole-leather piece *b*, with a protecting-flange rising therefrom and adapted to fit the outside of the upper contiguous to the edge of the insole. The wearing-edge of the protector is shown as the edge of the leather.

What is claimed in the invention of the said HENRY PORT, is—

1. A piece of sole-leather, provided about its edge with a flange to protect the upper, substantially as described.

2. A leather-sole, and a protecting-flange forming an integral part of said sole, substantially as described.

3. A piece of leather cut away or recessed at its upper surface to form a flange and to receive the upper and insole, substantially as described.

4. A leather sole provided with an upwardly-extending flange to guard and protect the upper, in combination with an upper and insole fitted into the recess at the upper edge of the sole, and within the concave portion of the flange, substantially as described.

5. A projecting upper-protecting sole-leather flange, formed to present the edge of the leather as the protecting or wearing edge, substantially as described.

GEO. W. GREGORY.

Witnesses:
GEO. L. ROBERTS,
W. J. PRATT.